UNITED STATES PATENT OFFICE.

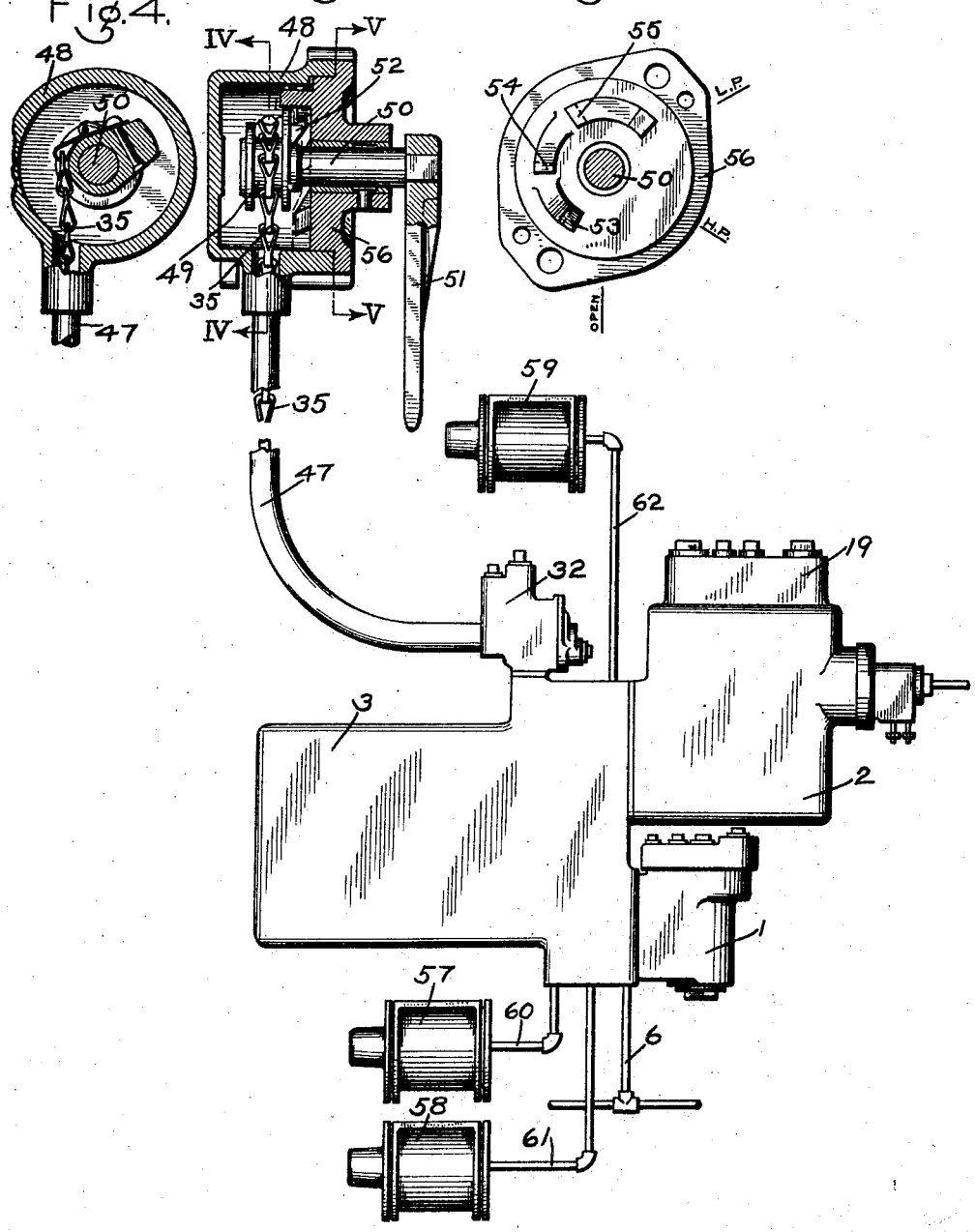

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOAD BRAKE EQUIPMENT.

1,400,595.  Specification of Letters Patent.  Patented Dec. 20, 1921.

Application filed July 10, 1920. Serial No. 395,341.

*To all whom it may concern:*

Be it known that I, CLYDE C. FARMER, a citizen of the United States, residing at Edgewood, in the county of Allegheny and State of Pennsylvania, have invented new and useful Improvements in Load Brake Equipments, of which the following is a specification.

This invention relates to fluid pressure brakes, and more particularly to a brake equipment in which the braking power may be regulated according as the car is empty or loaded.

In order to hold the brakes applied while operating on grades, so as to permit the brake system to be recharged with fluid under pressure, it is customary to employ retaining valves adapted to retain a predetermined degree of pressure in the brake cylinder.

With the retaining valve heretofore employed, the exhaust port, through which brake cylinder pressure in excess of the setting of the retaining valve is released, should be of a size to correspond with the brake cylinder volume which is connected thereto, so that a uniform rate of release will be obtained throughout the train. It will therefore be apparent that a retaining valve must be provided for each car having an exhaust port corresponding with the brake cylinder volume of that car.

One object of my invention is to provide a fluid pressure brake equipment in which the rate of exhaust through the retaining valve is determined at a point other than at the retaining valve, so that a retaining valve having the same sized exhaust port may be used in all cases regardless of the brake cylinder volume.

Another object of my invention is to provide an empty and load fluid pressure brake equipment in which the rate of exhaust through the retaining valve is maintained uniform for the brake cylinder volume employed whether the car is empty or loaded.

Another feature of my invention is to associate the retaining valve structure with the brake controlling valve structure so as to avoid the use of connecting pipes as heretofore employed.

Figure 1:
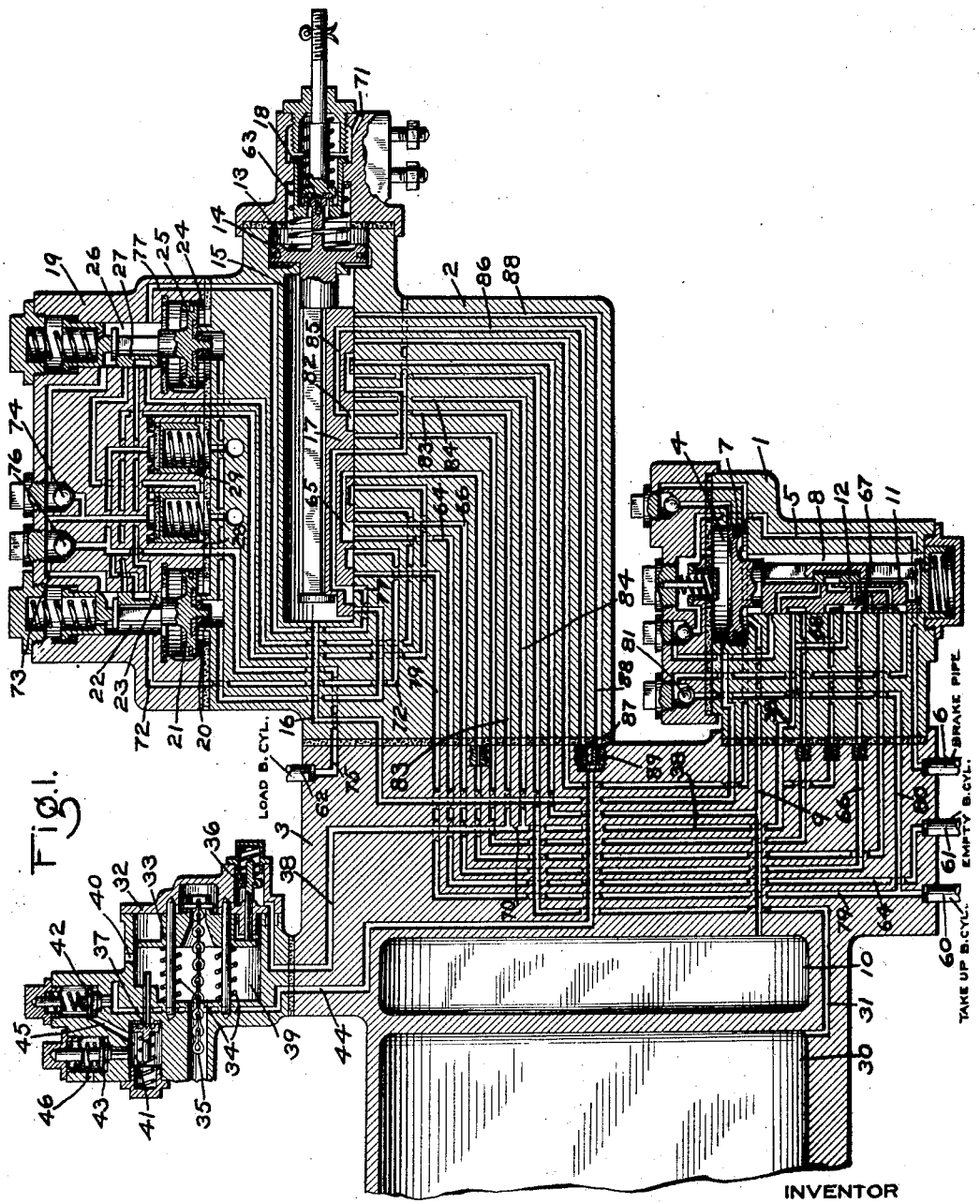
Figure 2:
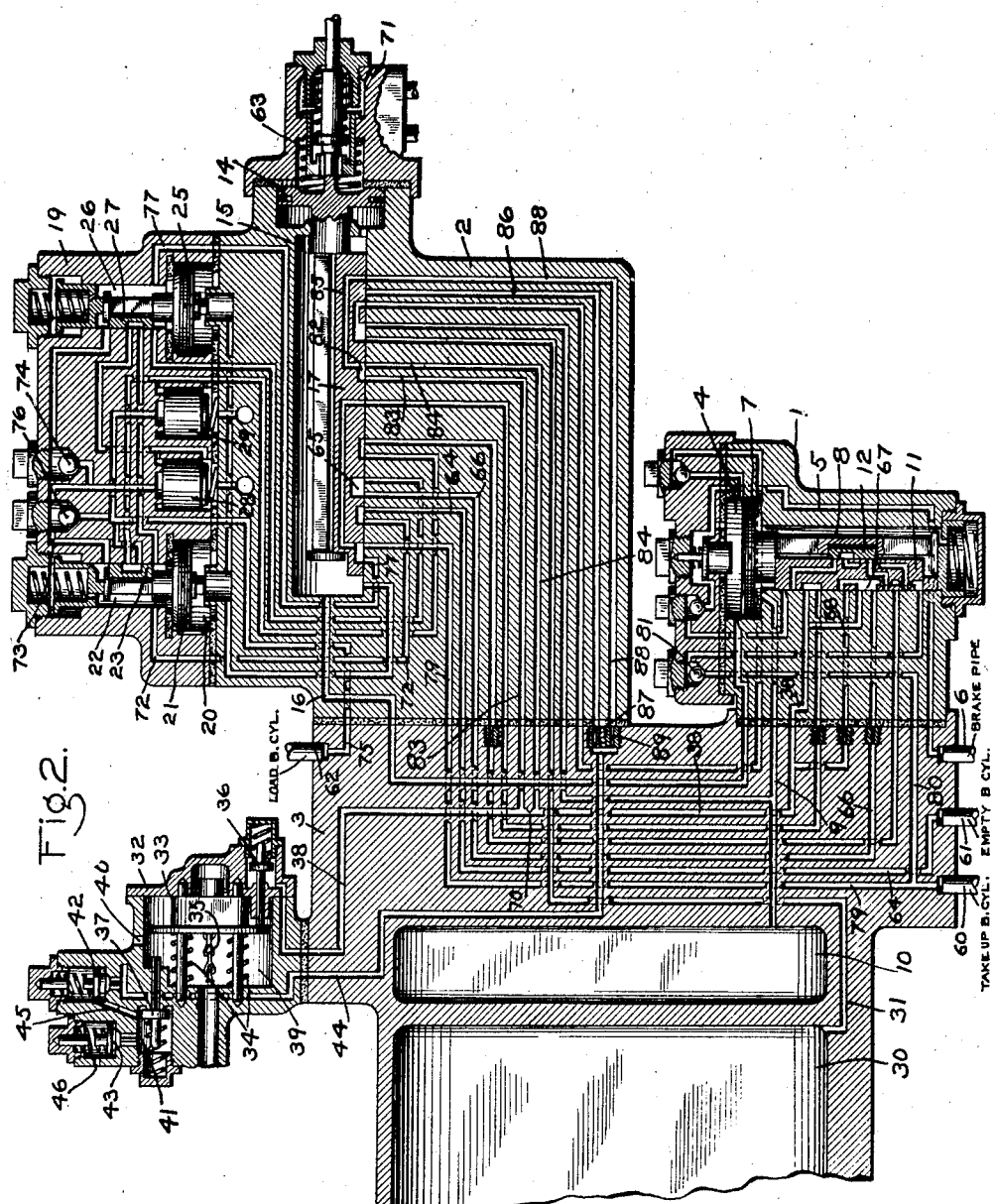

In the accompanying drawings; Figure 1 is a sectional diagrammatic view of an empty and load brake controlling valve device with my improvements applied thereto, showing the parts adjusted for empty car braking; Fig. 2 a similar view, showing the parts adjusted for loaded car braking; Fig. 3 a diagrammatic view of an empty and load brake equipment for a car; Fig. 4 a section on the line IV—IV of Fig. 3; and Fig. 5 a section on the line V—V of Fig. 3.

The empty and load brake controlling valve device shown in the drawings and to which my improvements are applied is substantially the same as that disclosed in the pending application of T. H. Thomas, Serial No. 321,399, filed September 3, 1919, and comprises a triple valve section 1, a change-over valve section 2, and a reservoir chamber section 3, the sections being secured together to form a unitary structure.

The triple valve section 1 has a piston chamber 4, connected by passage 5 to the usual brake pipe 6 and containing a piston 7, and a valve chamber 8, connected by passage 9 to auxiliary reservoir chamber 10 and containing a main slide valve 11, and a graduating slide valve 12 adapted to be operated by piston 7.

In the change-over valve section 2 there is a piston chamber 13 containing a piston 14 and a valve chamber 15, connected by a passage 16 to the piston chamber 4 and containing a slide valve 17 adapted to be operated by piston 14 for adjusting the apparatus for either empty or loaded car braking. A manually operated valve 18 controls the venting of fluid under pressure from piston chamber 13 for operating the piston 14.

Associated with the change-over valve section 2 is a section 19 having a piston chamber 20 containing a piston 21 and a valve chamber 22, containing a slide valve 23, and having a piston chamber 24 containing a piston 25 and a valve chamber 26 containing a valve 27 adapted to be operated by piston 25.

The section 19 also contains valve pistons 28 and 29.

The reservoir chamber section 3 contains the auxiliary reservoir chamber 10 and a load reservoir chamber 30, connected to a passage 31, leading to the seat of the change-over slide valve 17.

A retaining valve structure 32 is secured to the section 3 and contains a movable member 33, subject on one side to the pressure of springs 34, tending to move the member in one direction, and connected to an operating chain or cable 35, which leads to the desired operating point, for moving the member 33 in the opposite direction.

The member 33 is adapted to control the operation of valves 36 and 37, the valve 36 being adapted to control communication from passage 38 to chamber 39 and an atmospheric exhaust port 40 and the valve 37 from a chamber 41 to the chamber 39.

There are two retaining valves 42 and 43, the retaining valve 42 controlling communication from an exhaust passage 44 to a passage 45, leading to chamber 41, and the retaining valve 43 controlling communication from chamber 41 to an atmospheric exhaust port 46.

As shown in Fig. 3 of the drawing, the operating chain 35 is contained in a pipe 47 which leads to a manually controlled chain operating device 48, comprising a casing containing a drum 49 carried by a spindle 50 adapted to be operated by a handle 51. The chain 35 is secured to the drum 49, so that the rotation of the drum by the handle 51 operates the chain.

The operating handle has three positions, open, high pressure, and low pressure, and the parts are locked in the respective positions by providing a pawl 52 on the drum 49, which is adapted to engage stops 53, 54, and 55 on the cap member 56 of the device, when the handle is shifted laterally.

A take-up brake cylinder 57, an empty car brake cylinder 58, and a loaded car brake cylinder 59 are connected to the reservoir section 3 by the respective pipes 60, 61, and 62.

In operation, fluid supplied to the brake pipe 6 flows through passage 5 to the piston chamber 4 of the triple valve device and thence through the usual feed groove around the piston 7 to valve chamber 8, charging the auxiliary reservoir 10 through passage 9.

If the car is empty, the change-over valve device is adjusted for empty braking, as shown in Fig. 1, in which the valve 18 is held closed and the valve chamber 15 being charged from piston chamber 4 through passage 16, fluid flows through the feed groove around the piston 14 to piston chamber 13, and the fluid pressures on opposite sides of the piston being equalized, the spring 63 maintains the piston 14 and slide valve 17 in the position shown.

If no pressure is to be retained in the brake cylinder, the handle 51 of the retaining valve device is placed in the open position, which permits the release of the chain 35, so that the springs 34 will shift the member 33 to the position shown. In this position, the member 33 maintains the valve 36 off its seat and permits the valve 37 to remain closed.

Since the present invention relates only to the release and pressure retaining features of the empty and load brake, it is not deemed necessary to describe the operation of the apparatus in effecting a brake application, particularly as the operation is the same as that of the hereinbefore mentioned patent application, Serial No. 321,399.

Accordingly, assuming that the brakes have been applied and the release of the brakes is to be effected, the triple valve parts having been shifted to release position in the usual manner, the empty brake cylinder 58, which is the only brake cylinder cut in at this time, is connected to the exhaust through pipe 61, passage 64, cavity 65 in the change-over slide valve 17, passage 66, cavity 67 in tripple slide valve 11, passage 68, and passage 38, containing a restricted port 70 which limits the rate of exhaust from the brake cylinder to correspond with the empty brake cylinder. From passage 38, fluid flows past the open valve 36 of the retaining valve device to chamber 39 and thence to the atmosphere through port 40.

If the apparatus is to be set for loaded car braking, the valve 18 is manually opened, so as to vent fluid from the piston chamber 13 of the change-over valve device to an atmospheric exhaust port 71. The piston 14 is then shifted and moves the slide valve 17 to the load position, as shown in Fig. 2 of the drawings.

In this position, the load reservoir 30 is connected to the auxiliary reservoir 10, and in applying the brakes, fluid is first supplied to the take-up brake cylinder 57 and also flows to valve chamber 26 in valve section 19 and at a predetermined pressure shifts piston 25 and valve 27 to a position for connecting the reservoir volumes to the empty brake cylinder 58.

Fluid supplied to the empty brake cylinder also flows to valve chamber 22 and at a predetermined pressure in the empty brake cylinder, the piston 21 and valve 23 are operated to connect the reservoir volume with the load brake cylinder 59.

The brakes are thus applied in the load position with the force due to the three brake cylinders.

In releasing after an application of the brakes, fluid is released from the empty brake cylinder 58 through passage 64 passage 72, valve chamber 22, passage 73, past check valve 74 to valve chamber 26. Fluid from the load brake cylinder 59 exhausts through passage 75, past check valves 76 and 74 to valve chamber 26. From valve chamber 26 fluid from both the empty and load brake cylinders then flows through passage 77, cavity 78 in change-over slide valve 17, to passage 79 where it combines with fluid from the take-up brake cylinder 57 and flows through passage 80, past check valve 81, through cavity 67 in triple slide valve 11 to passage 68 and passage 38.

In the load position of the change-over valve 17, a cavity 82 connects passages 83 and 84, opening an additional communication around the restricted port 70, so that the area of the release passage is increased to correspond with the increased brake cylinder volume handled. Fluid from all the brake cylinders then flows through passage 38, past the valve 36 of the retaining valve device to the exhaust port 40.

If it is desired to retain a high pressure in the brake cylinder, the handle 51 of the retaining valve operating device is turned to the high pressure position, so that the chain 35 is operated to shift the movable member 33 sufficiently to permit the valve 36 to close, but not far enough to open the valve 37.

The valve 36 being closed, fluid cannot exhaust through the passage 38 as before, but must exhaust through passage 44. In this case, the exhaust from the empty brake cylinder is through passage 64, cavity 65, passage 66, cavity 67, passage 68, passage 38 to passage 83, through cavity 85 in the change-over valve 17 to passage 86.

The passage 86 is connected to passage 44 through a restricted port in a choke plug 87, of such size as to give the slow rate of discharge from the brake cylinder which is desired when the retaining valve is cut in. Fluid from passage 44 flows to the retaining valve 42 and if at a pressure above the pressure at which the retaining valve 42 is set, said retaining valve is opened, so that fluid passes to chamber 41. When the pressure in chamber 41 exceeds the pressure at which the retaining valve 43 is set, the valve 43 is opened to permit the exhaust of the excess pressure to the atmosphere through port 46.

It will thus be seen that the pressure retained in the brake cylinder will be equal to the combined pressures at which the retaining valves 42 and 43 open.

If the change-over valve device is set for load braking, the exhaust of fluid from all the brake cylinders will be through the passage 38, as hereinbefore described in connection with the load position with the retaining valves cut out, and thence through passage 83, cavities 82 and 85 in the change-over valve 17 to passage 88, which connects with the passage 44 through a restricted port in a choke plug 89 of larger size than the restricted port in the choke plug 87, so as to permit the rate of discharge to correspond with the increased brake cylinder volumes handled.

The retaining valves then operate to retain pressure in the brake cylinders as in the case of the apparatus set for empty car braking, as hereinbefore described.

If it is desired to retain only a low pressure in the brake cylinder, the handle 51 is turned to the low pressure position, in which the chain 35 is operated so as to move the member 33 to a position for opening the valve 37. When the valve 37 is open, fluid vented from the brake cylinder flows from passage 44 to the retaining valve 42 and pressure in excess of the setting of this retaining valve flows past same to chamber 41 and thence past the open valve 37 to the exhaust port 40, so that only the retaining valve 42 is cut in and the pressure retained in the brake cylinder will be that corresponding with the setting of the retaining valve 42.

The retaining valve 42 then limits the pressure either in the empty or load position of the parts, since in either case, fluid is exhausted through the passage 44.

Having now described my invention, what I claim as new and desire to secure by Letters Patent, is:

1. In a fluid pressure brake, the combination with a plurality of brake cylinders and means for connecting one or more brake cylinders into service according as the car is empty or loaded, of a valve device for retaining fluid under pressure in the brake cylinders and means for releasing fluid at one rate through the retaining valve device when one brake cylinder is cut in and at a greater rate when a plurality of brake cylinders are cut in.

2. In a fluid pressure brake, the combination with a plurality of brake cylinders and means for connecting one or more brake cylinders into service according as the car is empty or loaded, of a valve device for retaining fluid under pressure in the brake cylinders and means for providing a rate of release of fluid under pressure from the brake cylinders corresponding with the brake cylinder volume in service.

3. In a fluid pressure brake, the combination with a plurality of brake cylinders and means for connecting one or more brake cylinders into service according as the car is empty or loaded, of a valve device for retaining fluid under pressure in the brake cylinders and means located between the brake cylinders and the retaining valve device for determining the rate of release of fluid under pressure from the brake cylinders through the retaining valve device.

4. In a fluid pressure brake, the combination with a plurality of brake cylinders and means for connecting one or more brake cylinders into service according as the car is empty or loaded, of a valve device for retaining fluid under pressure in the brake cylinders and means providing one rate of release of fluid from the brake cylinders when the retaining valve device is cut in and another rate of release when the retaining valve device is cut out.

5. In a fluid pressure brake, the combination with a brake cylinder and a retaining valve device, of means located between the brake cylinder and the retaining valve device for providing one rate of release of fluid from the brake cylinder with the retaining valve cut in and another rate of release with the retaining valve cut out.

6. In a fluid pressure brake, the combination with a plurality of brake cylinders and a retaining valve device for retaining fluid under pressure in the brake cylinders, of a change-over valve device having a position for cutting in one brake cylinder volume and another position for cutting in an increased brake cylinder volume and means controlled by said change-over valve device for determining the port capacity through which fluid is released from the brake cylinders to the retaining valve device.

7. In a fluid pressure brake, the combination with a plurality of brake cylinders and a retaining valve device, of an empty and load brake controlling valve device having one brake cylinder release port capacity corresponding with the brake cylinder volume of an empty car, another release port capacity for the brake cylinder volume of an empty car with the retaining valve cut in, a third port capacity for a brake cylinder volume corresponding with a loaded car, and a fourth port capacity for a loaded car brake cylinder volume with the retaining valve cut in.

8. In a fluid pressure brake, the combination with a plurality of brake cylinders and a retaining valve device for retaining a predetermined pressure in the brake cylinders, of an empty and load brake controlling valve device for varying the brake cylinder volume according as the car is empty or loaded and having a different port area through which fluid is released from the brake cylinders for empty car braking with the retaining valve cut in or cut out and for loaded car braking with the retaining valve cut in or cut out.

9. In a fluid pressure brake, the combination with a brake controlling valve device, of a retaining valve device applied to the controlling valve device to form a unitary structure and mechanical means adapted to be manually actuated from a distant point for operating said retaining valve device.

10. In a fluid pressure brake, the combination with a brake controlling valve device having a face provided with port openings, of a retaining valve device having a face adapted to be applied to the face of the controlling valve device and provided with corresponding port openings and mechanical manually actuated means for operating said retaining valve device from a remote point.

11. In a fluid pressure brake, the combination with a brake cylinder, and a brake controlling valve device having two brake cylinder exhaust passages, of a retaining valve device comprising a retaining valve connected to one exhaust passage, a valve for controlling communication from the other exhaust passage to the atmosphere, and a manually operated member for operating said valve.

12. In a fluid pressure brake, the combination with a brake cylinder and a brake controlling valve device having two brake cylinder exhaust ports, of a retaining valve device comprising a pair of retaining valves, one of which is connected to one brake cylinder exhaust port, a valve for controlling communication from said retaining valve to an exhaust port, a valve for controlling the other brake cylinder exhaust port, and a manually operated member for actuating said valves.

13. In a fluid pressure brake, the combination with a brake cylinder, of a retaining valve device comprising a pair of retaining valves, a valve for controlling the exhaust from one retaining valve, a valve for controlling a direct brake cylinder exhaust port, and a manually operated member having one position for opening one valve, another position for opening the other valve and a third position in which both valves are closed.

14. In a fluid pressure brake, the combination with a brake cylinder, of a retaining valve device comprising a pair of connected retaining valves, a valve for controlling communication from one retaining valve to an atmospheric exhaust port, a valve for controlling the direct exhaust of fluid from the brake cylinder, and a manually operated member having a position for opening one valve, another position for opening the other valve, and an intermediate position in which both valves are closed.

In testimony whereof I have hereunto set my hand.

CLYDE C. FARMER.